(12) United States Patent
Fisher et al.

(10) Patent No.: US 8,059,280 B2
(45) Date of Patent: Nov. 15, 2011

(54) METHOD FOR THREE-DIMENSIONAL IMAGING USING MULTI-PHASE STRUCTURED LIGHT

(75) Inventors: Lance K. Fisher, Excelsior, MN (US); Paul R. Haugen, Bloomington, MN (US)

(73) Assignee: CyberOptics Corporation, Golden Valley, MN (US)

( * ) Notice: Subject to any disclaimer, the term of this patent is extended or adjusted under 35 U.S.C. 154(b) by 443 days.

(21) Appl. No.: 12/023,484

(22) Filed: Jan. 31, 2008

(65) Prior Publication Data

US 2009/0195772 A1    Aug. 6, 2009

(51) Int. Cl.
*G01B 11/00* (2006.01)
*G01B 11/24* (2006.01)

(52) U.S. Cl. ....................................................... 356/610
(58) Field of Classification Search ........... 356/601–605
See application file for complete search history.

(56) References Cited

U.S. PATENT DOCUMENTS

| | | | |
|---|---|---|---|
| 2,625,856 A | 1/1953 | Muller | |
| 3,777,061 A | 12/1973 | Takemura | 178/5.4 R |
| 3,995,107 A | 11/1976 | Woywood | 178/7.1 |
| 4,541,010 A | 9/1985 | Alston | 358/44 |
| 4,598,321 A | 7/1986 | Elabd et al. | 358/213 |
| 4,641,972 A | 2/1987 | Halioua et al. | 356/376 |
| 4,643,565 A | 2/1987 | Goto | 356/24 |
| 4,677,473 A | 6/1987 | Okamoto et al. | 358/101 |
| 4,782,394 A | 11/1988 | Hieda et al. | 358/213.19 |
| 4,835,616 A | 5/1989 | Morcom | 358/213.19 |
| 4,949,172 A | 8/1990 | Hunt et al. | 358/101 |
| 4,963,024 A | 10/1990 | Ulich | 356/342 |
| 4,984,893 A | 1/1991 | Lange | 356/376 |
| 5,003,187 A | 3/1991 | Zumbrunn et al. | 250/560 |
| 5,039,868 A | 8/1991 | Kobayashi et al. | 250/572 |
| 5,069,548 A | 12/1991 | Boehnlien | 356/376 |
| 5,091,963 A | 2/1992 | Litt et al. | 382/8 |
| 5,103,105 A | 4/1992 | Ikegaya et al. | 250/561 |

(Continued)

FOREIGN PATENT DOCUMENTS

DE    40 11 407 A1    10/1991
(Continued)

OTHER PUBLICATIONS

International Search Report and Written Opinion for international patent application No. PCT/US2008/087698, dated Apr. 8, 2009.

(Continued)

*Primary Examiner* — Tarifur Chowdhury
*Assistant Examiner* — Tara S Pajoohi
(74) *Attorney, Agent, or Firm* — Christopher R. Christenson; Westman, Champlin & Kelly, P.A.

(57) ABSTRACT

A method for mapping height of a feature upon a test surface is provided. The method includes projecting patterned illumination upon the feature, the patterned illumination having a plurality of distinct fringe periods. A first image of the feature is acquired while the patterned illumination is projected upon the feature. Relative movement is then generated between a sensor and the feature to cause relative displacement of a fraction of a field of view of a detector, the fraction being equal to about an inverse of the number of distinct regions of a reticle generating the pattern. Then, a second image of the feature is acquired while the patterned illumination is projected upon the feature. The height map is generated based, at least, upon the first and second images.

11 Claims, 5 Drawing Sheets

U.S. PATENT DOCUMENTS

| | | | | |
|---|---|---|---|---|
| 5,135,308 | A | 8/1992 | Kuchel | 356/376 |
| 5,278,634 | A | 1/1994 | Skunes et al. | 356/400 |
| 5,298,734 | A | 3/1994 | Kokubo | 250/208.1 |
| 5,307,152 | A | 4/1994 | Boehnlien et al. | 356/376 |
| 5,406,342 | A * | 4/1995 | Jongsma | 351/212 |
| 5,406,372 | A | 4/1995 | Vodanovic et al. | 356/394 |
| 5,424,552 | A | 6/1995 | Tsuji et al. | 250/548 |
| 5,450,204 | A | 9/1995 | Shigeyama et al. | 356/378 |
| 5,450,228 | A | 9/1995 | Boardman et al. | 359/209 |
| 5,455,870 | A | 10/1995 | Sepai et al. | 382/147 |
| 5,546,127 | A | 8/1996 | Yamashita et al. | 348/297 |
| 5,555,090 | A | 9/1996 | Schmutz | 356/381 |
| 5,636,025 | A | 6/1997 | Bieman et al. | 356/374 |
| 5,646,733 | A | 7/1997 | Bieman | 356/376 |
| 5,668,665 | A | 9/1997 | Choate | 359/663 |
| 5,684,530 | A | 11/1997 | White | 348/131 |
| 5,686,994 | A | 11/1997 | Tokura | 356/376 |
| 5,691,784 | A | 11/1997 | Hausler et al. | 349/1 |
| 5,708,532 | A | 1/1998 | Wartmann | 359/663 |
| 5,761,337 | A | 6/1998 | Nishimura et al. | 382/150 |
| 5,774,221 | A | 6/1998 | Guerra | 356/376 |
| 5,815,275 | A | 9/1998 | Svetkoff et al. | 356/376 |
| 5,862,973 | A | 1/1999 | Wasserman | 228/105 |
| 5,867,604 | A | 2/1999 | Ben-Levy et al. | 382/254 |
| 5,878,152 | A | 3/1999 | Sussman | 382/106 |
| 5,912,984 | A | 6/1999 | Michael et al. | 382/154 |
| 5,953,448 | A | 9/1999 | Liang | 382/154 |
| 5,969,819 | A | 10/1999 | Wang | 356/371 |
| 5,982,927 | A | 11/1999 | Koljonen | 382/168 |
| 5,991,461 | A | 11/1999 | Schmucker et al. | 382/284 |
| 5,995,232 | A | 11/1999 | Van Der Ven | 356/395 |
| 5,999,266 | A | 12/1999 | Takahashi et al. | 356/376 |
| 6,028,673 | A | 2/2000 | Nagasaki et al. | 356/608 |
| 6,049,384 | A | 4/2000 | Rudd et al. | 356/376 |
| 6,061,476 | A | 5/2000 | Nichani | 382/270 |
| 6,081,613 | A | 6/2000 | Ikurumi et al. | 382/147 |
| 6,084,712 | A | 7/2000 | Harding | 359/618 |
| 6,180,935 | B1 | 1/2001 | Hoagland | 250/208 |
| 6,185,273 | B1 | 2/2001 | Sperschneider | 378/58 |
| 6,201,892 | B1 | 3/2001 | Ludlow et al. | 382/149 |
| 6,232,724 | B1 | 5/2001 | Onimoto et al. | 315/161 |
| 6,268,923 | B1 | 7/2001 | Michniewicz et al. | 356/512 |
| 6,269,197 | B1 | 7/2001 | Wallack | 382/285 |
| 6,303,916 | B1 | 10/2001 | Gladnick | 250/205 |
| 6,307,210 | B1 | 10/2001 | Suzuki et al. | 250/599.08 |
| 6,445,813 | B1 | 9/2002 | Ikurumi et al. | 382/147 |
| 6,496,254 | B2 | 12/2002 | Bostrom et al. | 356/237.2 |
| 6,522,777 | B1 | 2/2003 | Paulsen et al. | 382/154 |
| 6,549,647 | B1 | 4/2003 | Skunes et al. | 382/150 |
| 6,577,405 | B2 | 6/2003 | Kranz et al. | 356/601 |
| 6,593,705 | B1 | 7/2003 | Rudd et al. | 315/241 |
| 6,750,899 | B1 | 6/2004 | Fishbaine et al. | 348/126 |
| 6,937,350 | B2 * | 8/2005 | Shirley | 356/630 |
| 2006/0154156 | A1 * | 7/2006 | Farah | 430/5 |

FOREIGN PATENT DOCUMENTS

| | | |
|---|---|---|
| DE | 19 511 160 | 3/1995 |
| EP | 0 453 977 A2 | 10/1991 |
| EP | 0660 078 A1 | 12/1994 |
| WO | WO 97/36144 | 10/1997 |
| WO | WO 98/59490 | 6/1998 |
| WO | WO 99/12001 | 3/1999 |
| WO | WO 99/24786 | 5/1999 |
| WO | WO 0106210 A1 | 1/2001 |
| WO | WO 01/50760 | 7/2001 |
| WO | WO 0154058 A2 | 7/2001 |
| WO | WO 0154068 A2 | 7/2001 |
| WO | WO 02/01209 A1 | 1/2002 |
| WO | WO 02/01210 A1 | 1/2002 |

OTHER PUBLICATIONS

Hus-Nan Yen, Du-Ming Tsai, and Jun-Yi Yang, "Full-field 3D measurement of solder pastes using LCD-based phase shifting techniques," IEEE Transactions on Electronics Packaging Manufacturing, vol. 29, No. 1, 2006, pp. 50-57.

"Rank Order Morphological Hit-Miss Transform and Its Optical Implementation," by Huiquan et al., ACTA OPTICA SINICA, vol. 19, No. 9, pp. 1256-1263 (Sep. 1999).

"Cognex and Sony Team Develops Machine-Vision Camera," Vision Systems Design, p. 15 (Feb. 1999).

"3-D Profilometry Based on Modulation Measurement," by Likun et al., vol. 19, No. 9, p. 1-11 (Sep. 1999).

"High Frame Rate Cameras," Princeton Instruments Catalog of High Performance Digital CCD Cameras, 2 pages (Oct. 1994).

"Area Array CCD Image Sensor 1023-1023 Pixels with Antiblooming," CCD Products, Thomson-CSF Semiconducteurs Specifiques, pp. 267-273 (1996).

"Accurate Machine Vision is the 'Telecentric Advantage,'" 3 pages from website.

International Search Report from Application No. PCT/US01/00330 with international filing date of May 1, 2001.

International Search Report from Application No. PCT/US00/42764 with international filing date of Dec. 12, 2000.

First Office Action for the corresponding Chinese patent application No. 200880125886.5 dated Aug. 24, 2011.

* cited by examiner

Fig. 6

METHOD FOR THREE-DIMENSIONAL IMAGING USING MULTI-PHASE STRUCTURED LIGHT

BACKGROUND

Circuit boards that carry electronic circuits as well as discrete electronic components are well known. A circuit board substrate is prepared with predetermined conductor paths and pads for receiving the lead of an electronic component such as integrated circuit chips, resistors or capacitors. During the circuit board fabrication process, solder paste bricks are placed onto the board substrate at appropriate positions. The solder paste is usually applied by placing a screen onto the substrate, applying solder paste through the screen openings and removing the screen from the substrate. The circuit board electronic components are then positioned onto the substrate, preferably with a pick and place machine, with the leads of the electronic components placed on the respective solder paste bricks. The circuit board is passed through an oven after all of the components are positioned on a substrate to melt the solder paste thus creating an electrical as well as mechanical connection between the components and the substrate.

The size of the solder paste bricks and the accuracy with which they must be placed on the substrate has become increasingly smaller and tighter with the increased emphasis on miniaturization in the electronics industry. Solder paste brick heights can be as small as 100 microns and the height of the solder paste brick must often be measured to within 1 percent of the designed height and size. The center-to-center spacing between solder bricks is sometimes 200 microns. Too little solder paste can result in no electrical connection between the lead of an electronic component and the pad of the circuit board substrate. Too much paste can result in bridging and short-circuiting between the leads of a component.

A single circuit board can cost thousands or even tens of thousands of dollars to manufacture. Testing of a circuit board after the fabrication process is complete can detect errors in solder paste placement and component lead connection, but often the only remedy for a faulty board is the rejection of the entire board. It is accordingly imperative that a circuit board be inspected during the fabrication process so that improper solder paste placement can be detected prior to the placement of the electronic components onto the substrate. Such in-process solder inspection reduces the cost of failure since expensive components have not yet been placed onto the circuit board. Embodiments of the present invention are applicable to a variety of automated optical inspections relative to electronics manufacture. Important inspections include, solder paste inspection, adhesive or glue inspection, post-placement component inspection, lead/ball coplanarity inspection, et cetera.

U.S. Pat. No. 6,750,899, assigned to the Assignee of the present application, provides a height topology inspection system that is able to detect the size and height of solder paste by projecting light through a reticle so as to project a pattern of light onto an area of the printed circuit board. A board transport positions the board to at least two different positions, where each position corresponds to a different phase of the projected light. An image corresponding to each respective position phase is acquired at each position. The relative movement between the sensor and the board is measured, and a processor co-sites the at least two images and constructs a height map image with the co-sited images. The height map image is then used to detect size and height of solder paste on a circuit board.

While U.S. Pat. No. 6,750,899 represents an important contribution to the art of height topology inspection, there is some room for improvement. Accordingly, embodiments of the present invention, as will be described hereinafter, generally improve upon the design provided in U.S. Pat. No. 6,750,899.

SUMMARY

A method for mapping height of a feature upon a test surface is provided. The method includes projecting patterned illumination upon the feature, the patterned illumination having a plurality of distinct fringe periods. A first image of the feature is acquired while the patterned illumination is projected upon the feature. Relative movement is then generated between a sensor and the feature to cause relative displacement of a fraction of a field of view of a detector, the fraction being equal to about an inverse of the number of distinct regions of a reticle generating the pattern. Then, a second image of the feature is acquired while the patterned illumination is projected upon the feature. The height map is generated based, at least, upon the first and second images.

DETAILED DESCRIPTION OF ILLUSTRATIVE EMBODIMENTS

Embodiments of the present invention generally employ a technique for mapping, or otherwise measuring, height of a feature, such as solder paste, on a circuit board. Three-dimensional phase profilometry is a known technique. See, for example, U.S. Pat. Nos. 6,049,384 and 6,750,899, which patents issued to the assignee of the current application. Essentially, a light pattern is projected onto a substrate and is analogous to the pattern of dark and light areas cast onto a floor by sunlight passing through a Venetian blind. Just as the sunlight passing through a Venetian blind will present a pattern of parallel, straight stripes on a flat floor, the pattern of light on a flat surface, will be one of parallel, straight stripes, but varying in intensity according to the sinusoidal pattern of opacity of the reticle. Continuing the analogy to sunlight passing through a Venetian blind, it will be understood that when viewed from above, the pattern of stripes of sunlight will be shifted laterally if they strike an object (like a sleeping cat) having a height different from the height of the flat floor. Similarly, because the light is projected onto a flat surface at an angle to the plane of the flat surface, the pattern of stripes presented on the flat surface is shifted laterally from the presence of an object having a height different from the height of the flat surface.

Figure 1:
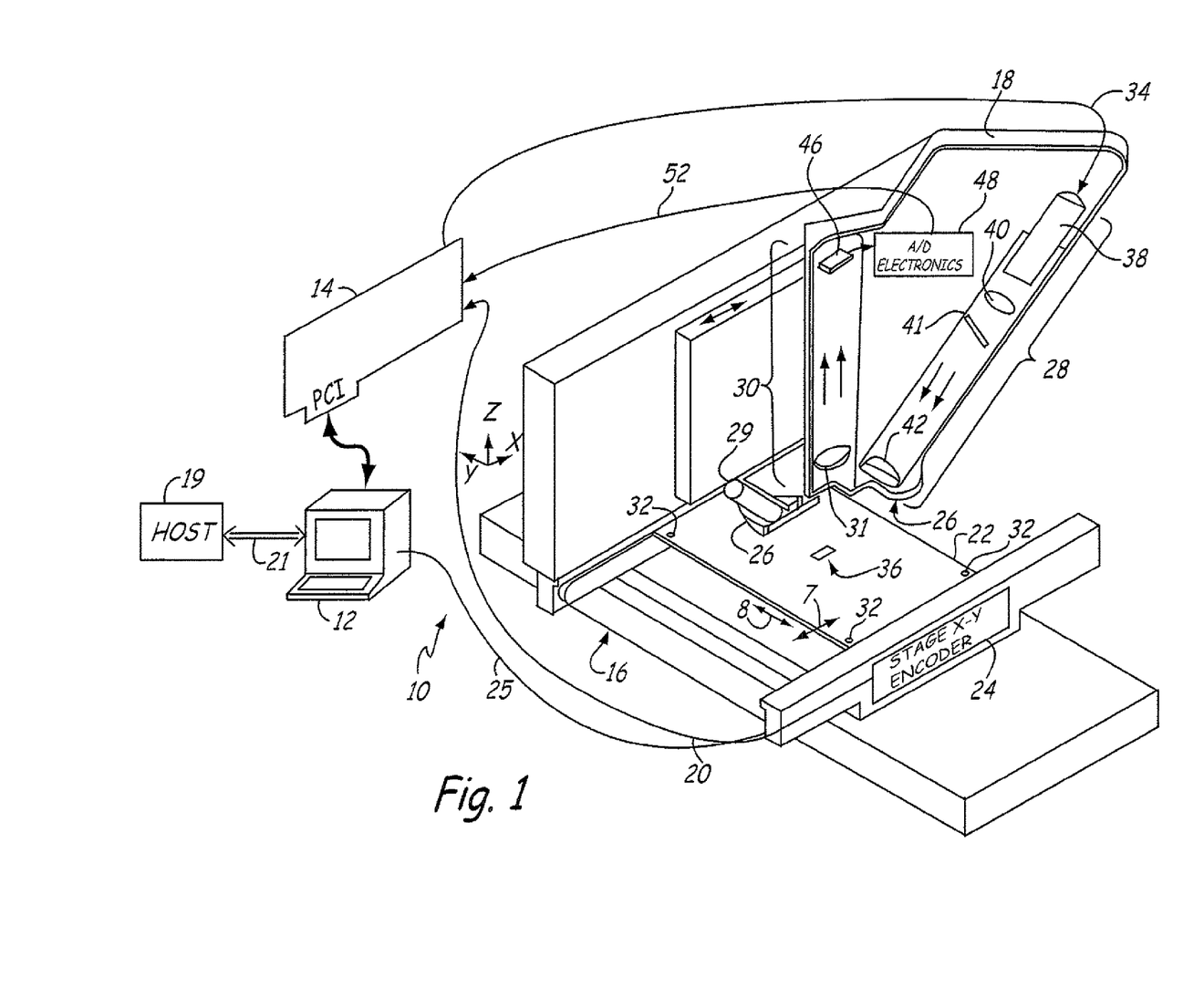
FIG. 1 is a diagrammatic view of a height topology inspection system with which embodiments of the present invention are useful.

FIG. 1 shows a height topology inspection system 10, which includes processor 14, X-Y motion system 16 and optical sensor system 18. For illustrative purposes, height topology inspection system 10 is as a solder paste inspection system, but those skilled in the art will recognize that system 10 can be used for other suitable types of topology inspections. Solder paste inspection system 10 is coupleable to host device 19 through network 21 or the like, in order to send and receive information related to solder inspection on printed circuit boards. For example, system 10 may receive location information relating to specific solder paste locations, and their respective nominal volume. Preferably, processor 14 is disposed within microcomputer 12, which microcomputer 12 is a known device having an input such as a keyboard, and mouse, and an output in the form of a video monitor. Additionally, microcomputer 12 preferably includes an industry-standard architecture and microprocessor. One example, is a personal computer running a Microsoft Windows® operating system with an Intel Pentium® processor.

Processor 14 is preferably embodied upon a computer peripheral card with an industry-standard form factor. Further, processor 14 is preferably adapted to couple to microcomputer 12 through a standard Peripheral Component Interconnect (PCI) bus. Processor 14 can then transfer data to and from microcomputer 12 using a known Direct Memory Access (DMA) transfer method to facilitate high-speed data transfer.

Processor 14 receives the digital video data from analog/digital electronics 48 and performs a number of functions on such data. For example, processor 14 triggers sensor system 18 to acquire images based upon encoder information received from encoders 24 through line 20. Processor 14 also communicates with sensor system 18 in order to control its operational mode (i.e. high-resolution vs. high-speed). Processor 14 receives previously digitized video data from sensor system 18 for storage in a frame buffer (not shown). Processor 14 operates upon the digitized video images to correct for defects in the particular CMOS array 46 in sensor system 18. Processor 14 is also used to compensate for effects of known optical distortions on the height map.

Processor 14 is coupled to X-Y motion system 16 through line 20. X-Y motion system 16 also includes X and Y motors (not shown) which position circuit board 22 in respective X and Y axes. X and Y motors are operably coupled to X and Y encoders (shown diagrammatically at block 24) to provide data indicative of circuit board position along X and Y axes to processor 14. Motion commands are sent over line 25 to system 16. System 16 is extraordinarily stable and its motion is controlled to within approximately a fraction of a pixel size over the distance required to acquire at least two phase images used to generate a height map. If system 16 is not sufficiently stable, additional processing in the electronics may be needed to provide equivalent accuracy and repeatability. In one embodiment, each of the linear encoders preferably has a resolution of about 0.5 µm, as can be purchased from Renishaw. Thus, through cooperation, computer 12 and X-Y motion system 16 precisely move circuit board 22 as desired in the X and Y directions at arrows 7, 8, respectively.

Optical sensor system 18 includes camera system 30 and projection system 28. Camera system 30 includes camera lens 31, a CMOS detector 46 and a set of A/D electronics 48. Projection system 28 includes flashlamp 38, condenser 40, reticle 41 and projector lens 42. All the components within system 18 are fixed within a housing for the system. System 18 is fixedly attached to a translation stage (not shown) to provide z movement for focus control.

Projection system 28 projects multiple phases of structured light onto solder paste features 36. Flashlamp 38 is preferably a high-speed strobe lamp filled with xenon gas, projecting broadband white light. A high speed discharge circuit (not shown) within housing 18 drives lamp 38, as timing signals through channel 34 cause lamp 38 to fire multiple times within a short period of time, preferably at least one millisecond between strobes in order to ensure that the flashlamp remains stable. High speed discharge circuits capable of providing three flashes within such a short time are critical to ensuring high system throughput. One example of such a high speed discharge circuit is provided in U.S. Pat. No. 6,593,705, entitled "Rapid-Firing Flashlamp Discharge Circuit" assigned to the assignee of the present application and herein incorporated by reference. Other types of illumination sources are usable with the present invention, such as a pulsed laser or a pulsed LED, as long they are able to provide a short duration, high energy successive pulses within the preferred time period. Condenser lens 40 collects light from flashlamp 38 and directs it through reticle 41 to the projector lens 42, which forms sinusoidally varying fringe images on the test surface 36. Preferably, reticle 41 has an astigmatic pattern and the projector lens is astigmatic, together reliably forming sinusoidally varying astigmatic patterns with low harmonic distortion.

Projector lens system 28 is preferably doubly telecentric, in that it is telecentric in reticle space and target space (at solder paste deposits 36 on board 22). The double telecentricity is important since it allows the height, volume and area calculations to be independent of the location of the solder paste within the field of view and depth of focus. This characteristic also provides lower distortion for the system as a whole, which is important because the target moves between exposures.

Camera system 30 views the projected fringes on the target of solder paste deposits 36, and acquires and digitizes images in rapid succession. Camera system 30 does not include a grating, as is incorporated in moiré interferometry systems. Preferably, camera system 30 is telecentric in target space and has low distortion for the same reasons given above. The size of the field of view is selected to maximize the field coverage while still maintaining sufficient resolution of the target. CMOS array 46 is a preferably a megapixel array and as such is able to inspect solder paste features of fine detail. For example, solder features for components such as a Chip Scale Package (CSP) or a microball grid array can be inspected. However, by sampling or combining data from individual pixels, larger equivalent pixels are generated which facilitates inspection at higher speeds. This larger effective pixel allows for high-speed applications and thus may reduce subsequent processing time. In one embodiment, the inspection mode can be rapidly switched between the high-resolution mode and the high-speed mode for different solder paste features on the same board, based upon the type of components that will be found in different areas of board 22. As such, optical sensor system 18 employs a dual-resolution capability in the same unit.

One limitation of prior phase profilometry methods for determining the height of a surface is phase wrap. Phase wrap produces height ambiguities due to the cyclic nature of the phase reconstruction technique. This problem is especially troubling for surfaces that have height variations that are larger than the phase period of the sensor as well as for surfaces that have discontinuous step height profiles. Attempts to address this problem generally include the addition of a second sensor or the modification of the fringe frequency within the image source generator. Adding a second sensor is a more expensive approach since two separate optical paths are required. Additionally, adding a method to change the fringe frequency with the same image source generator adds cost to the profilometer and requires multiple read cycles from the receive camera thereby slowing down the data acquisition rate of the sensor.

Embodiments of the present invention generally overcome deficiencies of previous attempts and provide a three-dimensional imaging system that has a vastly expanded effective height envelope without extra costs and speed penalties.

Figure 2:
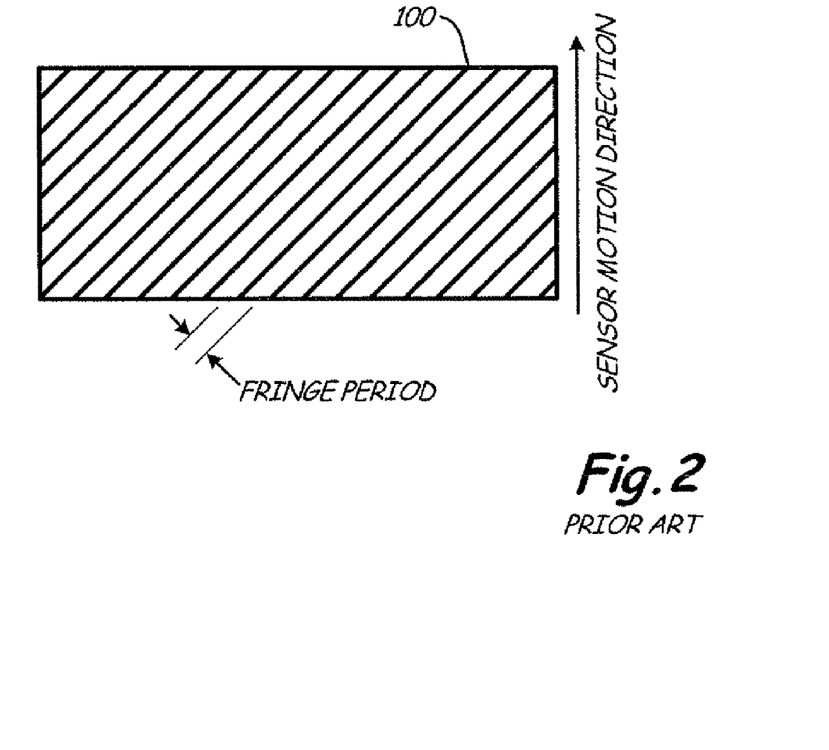
FIG. 2 is a diagrammatic view of a reticle pattern of a prior-art profilometer projected upon a flat surface.

FIG. 2 is a diagrammatic view of a reticle pattern of a prior-art profilometer projected upon a flat surface. As can be seen, pattern 100 is composed of a plurality of parallel lines of varying darkness arranged, preferably at an angle such as 45°, with respect to the direction of relative motion between the profilometer and the workpiece. The distance between the cycles of the pattern in FIG. 2 is considered the fringe period.

Figure 3:
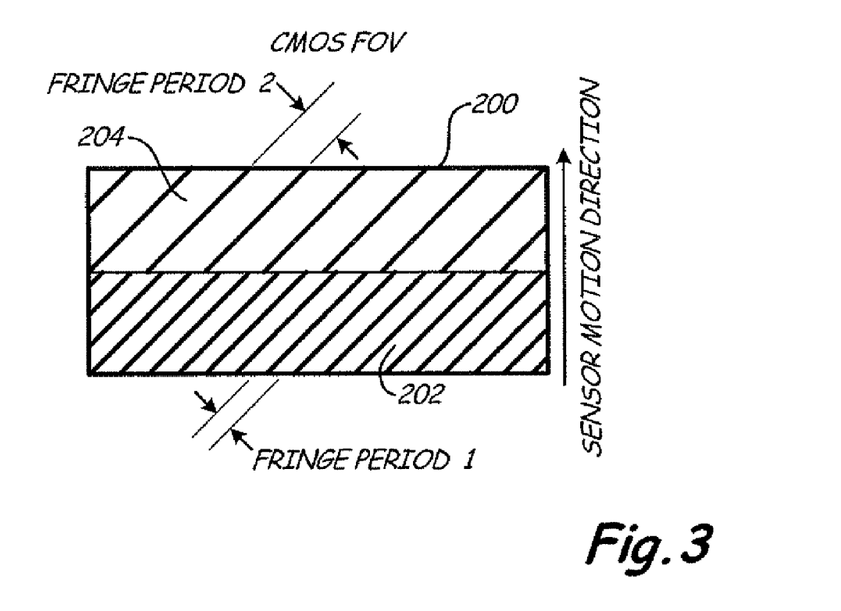
FIG. 3 is a diagrammatic view of a multi-phase reticle pattern projected in accordance with an embodiment of the present invention.

FIG. 3 is a diagrammatic view of a multi-phase reticle pattern projected in accordance with an embodiment of the present invention. As can be seen in FIG. 3, reticle pattern 200 bears some similarities to reticle pattern 100 in that it is comprised of a number of parallel lines that are generally at an angle with respect to the direction of relative motion between the sensor and the circuit board. However, as can be seen in FIG. 3, reticle pattern 200 includes a plurality of distinct phase regions. Specifically, region 202 has a relatively short fringe period thereby allowing very high precision, but also having a relatively low wrap height. Region 204 is disposed adjacent region 202 and has a fringe period that is different, in this case greater, than the fringe period of region 202. As illustrated in FIG. 3, the different regions 202, 204 are preferably aligned with each other. Further, the size of each fringe region 202, 204 is preferably equal. This preference remains even when additional fringe regions having still other fringe periods are employed. For example, if three regions are used, it is convenient that each of the three regions be of the same size.

The selection of the distinct fringe periods for the different regions is important. For example, one fringe period may be relatively large, for coarse height mapping. As long as the coarse height mapping function can determine a height to within the wrapping height of the second fringe period, it will be useful. Thus, a first fringe period may be very precise, but have a wrap height of only 1 millimeter. Then, a second fringe period may have a wrap height of 9 millimeters, but be able to discern height to within 1 millimeter. As can be appreciated, by leveraging the two against one another, the precision of the smaller fringe period can be used to obtain very precise height mapping within the entire height envelope of the larger fringe period. Other combinations of distinct fringe periods are also contemplated.

In the above example, only one of the fringe periods provides the extremely fine height precision, and the other is used for coarse height determination. However, two relatively similar fringe periods can be used to potentially provide an unambiguous, precision height map over a distance greater than the wrap height of each individual fringe height map. Thus, a fringe period having a wrap height of 1 millimeter used with a second fringe period having a wrap height of 1.2 millimeters will allow each to contribute to the precise height mapping and will provide a wrap height of 6 millimeters. This is because within the 6 millimeter height, the height information derived from the combination of each fringe period will only resolve to a single height within the 6 millimeter height envelope.

Figure 4:
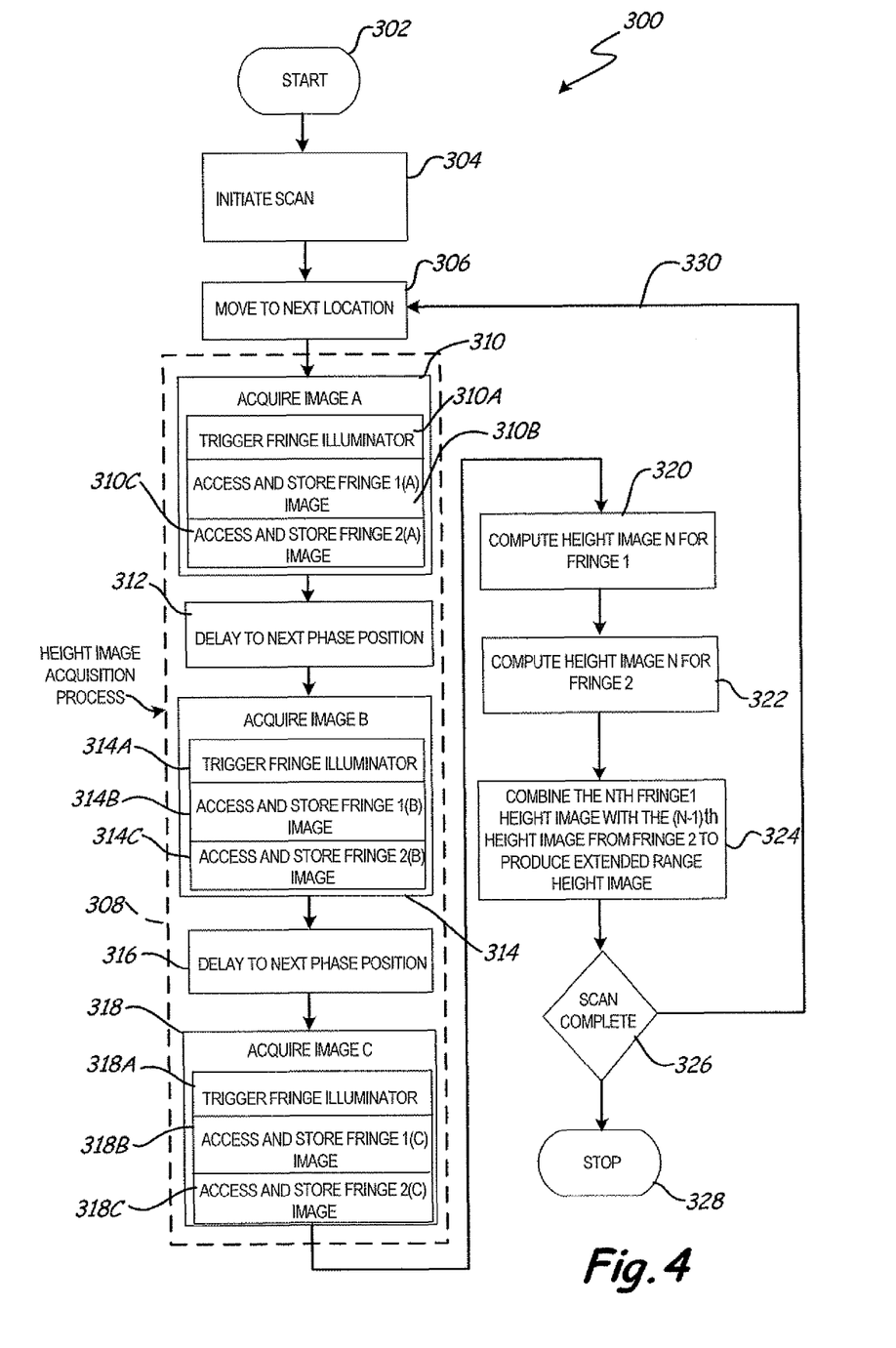
FIG. 4 is a flow diagram of a method of three-dimensionally imaging a test surface using multi-phase structured light in accordance with an embodiment of the present invention.

FIG. 4 is a flow diagram of a method of three-dimensionally imaging a test surface using multi-phase structured light in accordance with an embodiment of the present invention. To acquire images, sensor 18 is moved relative to the test surface 22 in the Y axis 8 as indicated in FIG. 1. Method 300 begins at block 302, where control passes to block 304. At block 304, the height scanning apparatus in initialized. Such initialization can include zeroing any suitable variables and/or registers, as well as starting the motion profile. Once the initialization is complete control passes to block 306 where the sensor is moved to a "next" location. This location is the location of a feature on the surface to be tested. Generally, this will be the location of a solder paste deposit, but could be any suitable location for which a height map is desired. Once the sensor is positioned correctly, block 308 begins, which is the overall height image acquisition process. Within block 308, block 310 executes first by acquiring a first image (Image A). Block 310 includes substeps 310A, 310B and 310C. At block 310A, the fringe illuminator is triggered. At this step, illumination, preferably strobed illumination, is fired through a reticle, such as reticle 41, that has two distinct fringe patterns. The illuminator is preferably triggered by stage encoders 24 when the sensor is positioned to acquire the first fringe image. This generates two distinct patterns within the field of view of CMOS sensor 46. At block 310B, fringe image 1A is accessed and stored. At block 310C, fringe image 2A is accessed and stored. Thus, for a single image acquisition, the illuminator projects the image of the reticle onto the test surface and an image is acquired on the area array imager. The image is downloaded from the imager and stored in memory of the controller. Accordingly, Fringe images 1A and 2A are acquired at the same time since they are within the same field of view of CMOS detector 46.

After Image A has been acquired in block 310, control passes to block 312 where the system waits until the next phase position is ready. This may be waiting until a motion control system generates relative motion between the workpiece and the sensor, or until a moving web has moved the workpiece a sufficient distance. It is important to note that the movement that occurs between the acquisition of Image A in block 310 and Image B in block 314 is in a single direction, such as the direction indicated in FIGS. 2 and 3.

At block 314, Image B is acquired. Like block 310, block 314 includes substeps 314A, 314B, and 314C. At block 314A, the fringe illuminator is triggered. At this step, illumination, preferably strobed illumination, is fired through a reticle, such as reticle 41, that has two distinct fringe patterns. This generates two distinct patterns within the field of view of CMOS sensor 46. At block 314B, fringe image 1B is accessed and stored. At block 314C, fringe image 2B is accessed and stored. Fringe images 1B and 2B are acquired at the same time since they are within the same field of view of CMOS detector 46.

After Image B has been acquired in block 314, control passes to block 316 where the system waits until the next phase position is ready.

At block 318, Image C is acquired. Like blocks 310 and 314, block 318 includes substeps 318A, 318B, and 318C. At block 318A, the fringe illuminator is triggered. At this step, illumination, preferably strobed, is fired through a reticle, such as reticle 41, that has two distinct fringe patterns. This generates two distinct patterns within the field of view of CMOS sensor 46. At block 318B, fringe image 1C is accessed and stored. At block 318C, fringe image 2C is accessed and stored. Fringe images 1C and 2C are acquired at the same time since they are within the same field of view of CMOS detector 46.

At blocks 320 and 322, the Nth Height Image is computed for Fringes 1 and 2, respectively. Next, at block 324, the Nth height image computed for Fringe 1 is combined with the (N−1)th height image for Fringe Image 2 to produce an extended range height image. Control then passes to block 326 where the system determines if the scan is complete. If the scan is complete, control passes to block 328 where the method ends. However, if the scan is not complete, control returns to block 306 via line 330 and the system moves to the "next" (N+1) location. Further, the movement between the current location (N) and the "next" location is preferably a fraction of the field of view of the CMOS detector. In embodiments where more than two distinct fringe periods are employed, the fraction is preferably equal to about an inverse of the number of distinct regions of the reticle generating the pattern.

By projecting more than one fringe period, the two, or more, fringe period areas can be acquired by the area array imager and processed separately as two distinct height maps. For each image acquisition cycle, the two or more height images generated by the two or more areas of the fringe image represent different areas of the test surface. However, because the sensor is required to move relative to the test surface and if the image areas of differing fringe period are aligned along the axis of sensor motion, each of the areas defined by the two fringe periods will be able to acquire an image of the test surface. Once the height information for a test surface has been acquired by each of the fringe periods, the individual height images can be compared and combined to extend the height range of the measurement past the wrap height of a single fringe image.

Figure 5:
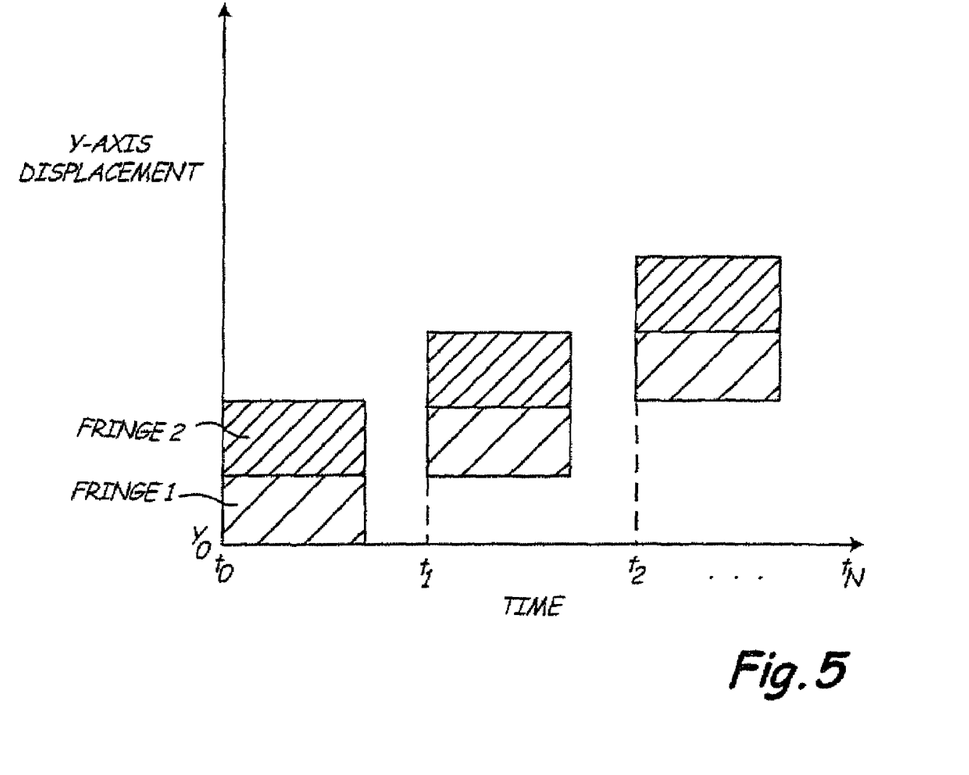
FIG. 5 is a timing chart illustrating Y-axis sensor displacement and fringe image acquisition over time, in accordance with an embodiment of the present invention.

FIG. 5 is a time chart illustrating Y-axis sensor displacement and fringe image acquisition over time, in accordance with an embodiment of the present invention. As can be seen in FIG. 5, at time frame to a reticle image having fringe patterns 1 and 2 is projected at position $y_0$. While this reticle image is projected (fringes 1 and 2) two, or preferably three, varying phase images are acquired. As is shown in U.S. Pat. No. 6,750,899, these images have a phase difference (such as three images being acquired at a phase difference of 120 degrees) that allows the a height map relative to the first time frame to be constructed. As can be seen in FIG. 5, the image acquisitions during time frame $t_0$ do not last until time frame $t_1$, instead there is a time lag between $t_0$ and $t_1$, where the sensor moves in the Y-axis to the next position. This delay is described with respect to block 306 in FIG. 4. Preferably, the sensor moves such that the images acquired during time frame $t_1$ include a portion of overlap in sensor field of view with the images acquired during time frame $t_0$. In the illustration, fringe pattern 1 in time frame $t_1$ overlaps with fringe pattern 2 from time frame $t_0$. As also illustrated in FIG. 5, this process continues until the sensor has scanned, or otherwise sensed, the entire Y-axis.

Figure 6:
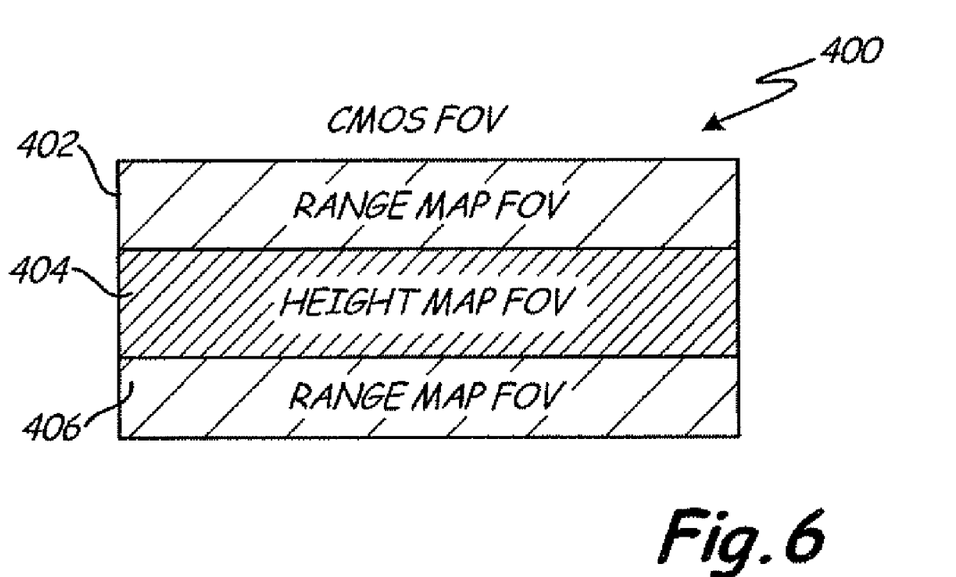
FIG. 6 is a diagrammatic view of a multi-phase reticle pattern projected in accordance with another embodiment of the present invention.

FIG. 6 is a diagrammatic view of a multi-phase reticle pattern projected in accordance with another embodiment of the present invention. Pattern 400 includes three distinct regions. Specifically, pattern 400 includes regions 402, 404, and 406. As can be seen in FIG. 6, region 404 is a height map region having a relatively smaller fringe period than regions 402, 406. Accordingly, when region 404 is projected upon a test surface, fine height detail can be ascertained. However, since the workpiece may not lay truly flat, one of regions 402, 404 can be used to coarsely determine height prior to the acquisition of an image bearing region 404. This allows the sensor Z height to be adjusted in order to provide better focus for the height map image. Once the z-height is adjusted, or confirmed, an image of region 404 upon the test surface is acquired. This allows the system to dynamically change focus to follow a board or workpiece that does not lie truly flat, and to still provide extremely precise height maps for features on that workpiece. Additionally, two fringe images are present to allow for the "focusing" information to be ahead of the fine resolution reticle which allows for motion in both directions.

Embodiments of the present invention generally provide a number of advantages. For example, the useful range of phase profilometer height measurement can be increased without decreasing resolution. Further, the same projector, image capture, and image processing mechanisms can be used to measure absolute height and/or identify a specific phase cycle in the height image as is used to develop the cyclic height measurement. Further still, no additional exposure time is required for determining the additional height information. Also, no additional hardware is believed to be required to project multiple fringe periods. These multiple fringe periods can be projected and acquired through the same optical systems. The multiple fringe periods can be acquired at the same time, reducing the acquisition time normal associated with the acquisition of multiple period fringe projections in stationary phase profilometers.

Although the present invention has been described with reference to preferred embodiments, workers skilled in the art will recognize that changes may be made in form and detail without departing from the spirit and scope of the invention. For example, while image detector 46 is described as a CMOS detector, any suitable detector, such as a CCD detector can be used.

What is claimed is:

1. A method for mapping height of a feature upon a test surface, the method comprising:
projecting patterned illumination upon the feature, the patterned illumination having a plurality of distinct fringe periods simultaneously projected;
acquiring a first plurality of images of the feature while the patterned illumination is projected upon the feature, the first plurality of images having at least two distinct phases to create a first height map;
generating relative movement between a sensor and the feature to cause relative displacement of a fraction of a field of view of a detector;
acquiring a second plurality of images of the feature while the patterned illumination is projected upon the feature, the second plurality of images having at least two distinct phases to create a second height map; and
combining the first and second height maps.

2. The method of claim 1, wherein the patterned illumination is generated by a strobed illuminator.

3. The method of claim 1, and further comprising,
after the second plurality of images is acquired, generating relative movement between a sensor and the feature to cause relative displacement of the sensor; and
acquiring a third plurality of images of the feature while the patterned illumination is projected upon the feature to generate a third height map, wherein the first, second and third height maps are combined.

4. The method of claim 1, and further comprising co-locating a portion of the first plurality of images with a portion of the second plurality of images.

5. The method of claim 1, wherein the plurality of distinct fringe periods are disposed adjacent one another within a field of view of the detector.

6. The method of claim 5, wherein the method of claim 1, wherein a first fringe period is projected in a first region, and a second fringe period is projected in a second region.

7. The method of claim 6, wherein the combined height map has a precision based on the smaller fringe period, but a wrap height that is greater than that of the larger fringe period.

8. The method of claim 1, wherein the fraction is equal to about an inverse of the number of distinct regions of a reticle generating the pattern.

9. A system for detecting a three-dimensional height of a feature on a workpiece, the system comprising:
- a robotic system to generate relative movement between the system and the feature;
- a projector configured to project patterned illumination upon the feature, the patterned illumination projecting at least two distinct fringe periods simultaneously;
- an image detector configured to acquire a plurality of images of the patterned illumination being projected upon the feature; and
- a processor coupled to the projector and the image detector, the processor being configured to generate a height map based at least upon the plurality of images.

10. The system of claim 9, wherein the projector includes a reticle configured to project the at least two distinct fringe periods simultaneously.

11. The system of claim 9, wherein the projector includes a strobe illuminator.

* * * * *